United States Patent [19]
Dixon

[11] Patent Number: 5,289,491
[45] Date of Patent: Feb. 22, 1994

[54] INTRACAVITY HARMONIC SUB-RESONATOR WITH EXTENDED PHASE MATCHING RANGE

[75] Inventor: George J. Dixon, Indian Harbour Beach, Fla.

[73] Assignee: Amoco Corporation, Chicago, Ill.

[21] Appl. No.: 34,260

[22] Filed: Mar. 22, 1993

[51] Int. Cl.$^5$ ............................................... H01S 3/08
[52] U.S. Cl. ..................................... 372/92; 372/99; 372/21; 372/84; 372/34; 372/105; 372/93
[58] Field of Search ..................... 372/98, 99, 21, 22, 372/34, 84, 92, 93, 105

[56] References Cited

U.S. PATENT DOCUMENTS

| 4,953,166 | 8/1990 | Mooradian | 372/21 |
| 5,123,026 | 6/1992 | Fan et al. | 372/21 |

OTHER PUBLICATIONS

Bethea, "Megawat Power at 1.318n in Nd$^{3+}$:YAG and Simultaneous Oscillation at Both 1.06 and 1.318n"; IEEE JQE p. 251, Feb. 1973.

Primary Examiner—Léon Scott, Jr
Attorney, Agent, or Firm—Stephen G. Mican

[57] ABSTRACT

Disclosure is made of a laser system comprising a non-linear crystal that converts light at a fundamental wavelength to light at a harmonic wavelength and that has a thickness such that there is a phase mismatch between light at the fundamental wavelength and light at the harmonic wavelength in said crystal; first means for forming one of a travelling wave optical cavity and a standing wave optical cavity at the fundamental wavelength; and second means for forming one of a travelling wave and a standing wave optical cavity at the harmonic wavelength, the first means and said second means are located relative to the faces of said crystal such that the total phase mismatch of the light at the fundamental wavelength and the light at the harmonic wavelength, in the round trip path through the crystal and between each face of the crystal and the first means and the second means, is equal to an integral multiple of $2\pi$.

23 Claims, 3 Drawing Sheets

INTRACAVITY HARMONIC SUB-RESONATOR WITH EXTENDED PHASE MATCHING RANGE

TECHNICAL FIELD

This invention relates to the general subject of solid-state lasers and, in particular, to a method and apparatus for intracavity generation of a harmonic output using quasi phase-matching.

BACKGROUND OF THE INVENTION

The process of "second harmonic generation" (SHG) is one of a number of non-linear optical (NLO) processes (e.g., difference-frequency generation, sum-frequency generation, optical mixing, parametric oscillation, etc.) by which light at one wavelength is converted into light of another wavelength. Specifically, in a SHG process, light at a fundamental wavelength (i.e., angular frequency $\omega$) is converted to light having a wavelength of one half (i.e., $2\omega$) of the fundamental (e.g., the second harmonic). Thus, using an appropriate NLO material, two photons can be added together in a SHG process to result in a single photon of higher energy. Second harmonic generation has been reviewed by A. Yariv in *Quantum Electronics*, 2nd Ed., John Wiley & Sons, New York, 1975, pp. 407–434 and by W. Koechner in *Solid State Laser Engineering*, Springer-Verlag, N.Y., 1976, pp. 491–524.

Materials having non-linear optical properties are well known. For example, U.S. Pat. No. 3,949,323, issued to Bierlein et al. on Apr. 6, 1976, discloses that non-linear optical properties are possessed by materials having the formula MTiO (XO$_4$) where "M" is at least one of K, Rb, Ti, or NH$_4$ and "X" is at least one of P or As, except when NH$_4$ is present, then "X" is only P. This generic formula includes potassium titanyl phosphate, KTiOPO$_4$, or KTP, which is a particularly useful non-linear material. Other known non-linear optical materials include, but are not limited to, KH$_2$PO$_4$ or KDP, LiNbO$_3$, KNbO$_3$, $\beta$-BaB$_2$O$_4$, Ba$_2$NaNb$_5$O$_{15}$, LiIO$_3$, HIO$_3$, KB$_5$O$_8$ 4H$_2$O, potassium lithium niobate and urea. A review of the non-linear optical properties of a number of different uniaxial crystals has been published in *Sov. J. Quantum Electron.*, Vol. 7, No. 1, January 1977, pp. 1–13. Non-linear optical materials have also been reviewed by s. Singh in the *CRC Handbook of Laser Science and Technology*, Vol. III, M. J. Weber, Ed., CRC Press, Inc. Boca Raton, Fla., 1986, pp. 3–228.

Electromagnetic waves having a frequency in the optical range and propagating through a non-linear crystal induce polarization waves which have frequencies equal to the sum and difference of those of the exciting waves. Such a polarization wave can transfer energy to an electromagnetic wave of the same frequency. The efficiency of energy transfer from a polarization wave to the corresponding electromagnetic wave is a function of (a) the magnitude of the second order polarization tensor, since this tensor element determines the amplitude of the polarization wave; and (b) the distance over which the polarization wave and the incident electromagnetic wave can remain sufficiently in phase.

The coherence length, $I_c$, is a measure of the phase relationship between the polarization wave and the incident electromagnetic wave and is given by the following relationship:

$$I_c = \pi/\Delta k$$

where "$\Delta k$" is the difference or mismatch between the wave vectors of the polarization and incident electromagnetic waves. More specifically, the coherence length is the distance from the entrance surface of the non-linear optical crystal to the point at which the power of the radiated electromagnetic wave will be at its maximum value. "Phase-matching" occurs when $\Delta k=0$. The condition $\Delta k=0$ can also be expressed as $n_3\omega_3 = n_1\omega_1 \pm n_2\omega_2$ where $\omega_3 = \omega_1 \pm \omega_2$; $\omega_1$ and $\omega_2$ are the frequencies of the input electromagnetic waves; $\omega_3$ is the frequency of the radiated output electromagnetic wave; and and $n_1$, $n_2$ and $n_3$ are the refractive indices of the respective waves in the non-linear optical crystal. In the special case of second harmonic generation, there is incident radiation of only one frequency, $\omega$; therefore $\omega_1 = \omega_2 = \omega$ and $\omega_3 = 2\omega$.

For appreciable conversion of optical radiation of one frequency to optical radiation of another frequency in a non-linear optical crystal, the interacting waves must stay substantially in phase throughout the crystal so that:

$$|\Delta k| = |k_3 - k_1 - k_2| < \pi/L$$

where $k_1$, $k_2$ and $k_3$ represent the wave numbers corresponding to radiation of frequencies $\omega_1$, $\omega_2$, and $\omega_3$, respectively, and "L" is the interaction length in the non-linear material. In the special case of second harmonic generation:

$$|\Delta k| = |k_2 - k_1| < \pi/L$$

or $$L < \frac{\pi}{\Delta k}$$

The term "substantially phase-matched," as used herein, means that $|\Delta k| < \pi/L$ for a given non-linear optical crystal.

A conventional method for achieving phase-matching in a non-linear optical material utilizes the fact that dispersion (i.e., the change of refractive index with frequency) can be offset by using the natural birefringence of uniaxial or biaxial crystals. In a typical case (Type I phase matched second harmonic generation) the fundamental and harmonic beams are orthogonally polarized in directions corresponding to the principal refractive indices of the crystal. The birefringence of the crystal is adjusted to compensate for the dispersion between the fundamental and harmonic radiation, thereby preserving the phase relationship between the two beams as they travel through the crystal. This technique, or modifications of it, can be used to achieve 'true' phase matching of a number of different nonlinear interactions including sum and difference frequency mixing and second harmonic generation.

Engineering the optical properties of an existing material provides an alternative to materials in which true phase-matching can be achieved. Quasi phase-matching (QPM) compensates for refractive index dispersion in nonlinear optical interactions. Unlike techniques which utilize the birefringence of anisotropic materials, QPM can be applied to isotropic materials or to interactions in which the interacting waves have the same polarization. The doubling crystal can be tailored to phase-match any given wavelength at room temperature by setting the period of the alternating nonlinearity to be twice the anticipated coherence length.

Three methods of achieving quasi phase-matching have been described in "Interactions between Light Waves in a Non-linear Dielectric" by J. A. Armstrong et al., *Physical Review*, Vol. 127, pp. 1918-1919 Sep. 15, 1962).

Continuous power flow from the fundamental into its second harmonic can be maintained along the length of a crystal by changing (e.g., "periodic poling" or "domain reversal") the sign of the nonlinear coefficient of the material at odd multiples of the coherence length. For periodic poling, the crystal must be stable after the periodic structural changes are made. In addition, surface and crystal quality must be such that losses due to optical scattering and absorption are low. This is not always possible. Periodic poling has been used in conjunction with lithium niobate to generate green and blue light. See Magel et al., "Second harmonic generation of blue light in periodically poled lithium niobate", *CLEO*-89, paper ThQ3, and Lim et al., "Second harmonic generation of green light in a periodically poled lithium niobate waveguide", *CLEO*-89, paper ThQ4. Also see U.S. Pat. No. 4,731,787 to Fan et al (i.e., FIG. 3).

Another method involves total internal reflection of both the fundamental and harmonic waves in a crystal of thickness:

$$d = \pi \cos \Theta / |k_2 - 2k_1|$$

where "$k_2 - 2k_1$" is the wave vector mismatch, and "$\Theta$" is angle between the beam propagation direction and a normal to the crystal surface. This method has been used successfully to phase-match second harmonic generation of 10.6 $\mu$m radiation in GaAs. See "Enhancement of Optical Second-Harmonic Generation (SHG) by Reflection Phase Matching in ZnS and GaAs," Boyd and Patel, *Appl. Phys. Letters*, 8, (1966) p. 313.

The final method, and the one to which the present invention is addressed, involves resonating the second harmonic in a crystal platelet which has a length L which is given by:

$$L < \frac{\pi}{|k_2 - 2k_1|}$$

where $\pi/|k_2 - 2k_1|$ is the coherence length for the interaction. Heretofore, this technique for achieving QPM does not appear to have been exploited by the art. In accordance with this method, if a monochromatic traveling wave is incident upon a "harmonic etalon" at a frequency which is one half that of one of its resonances, a harmonic wave is produced in the forward direction but not in the reverse.

Second harmonic generation within the cavity of a multi-longitudinal mode laser by an intercavity doubling crystal has been analyzed by T. Baer, *J. Opt. Soc. Am. B*, Vol. 3, No. 9, (1986) pp. 1175-1180. U.S. Pat. Nos. 4,656,635 and 4,701,929, both issued to Baer et al., disclose a laser diode-pumped, intracavity frequency-doubled, solid-state laser. A detailed theoretical analysis of a multi-longitudinal mode intracavity-doubled laser has been reported by X. G. Wu et al., *J. Opt. Soc. Am. B*, Vol. 4, No. 11, (1987) pp. 1870-1877.

In U.S. Pat. No. 4,847,851, G. J. Dixon disclosed a compact, diode-pumped, solid-state laser wherein the diode pump is butt-coupled to a laser gain material which absorbs 63% of the optical pumping radiation within a pathlength of less than 500 microns. In such a device, a divergent beam of optical pumping radiation from the diode pump is directed into a volume of the gain medium which has a sufficiently small transverse cross-sectional area so as to support only single transverse mode laser operation. Optical lenses are not needed for coupling.

J. J. Zayhowski and A. Mooradian, "Single-frequency Microship Nd Lasers," *Optics Letters*, Vol. 14, No. 1, (Jan. 1, 1989) pp. 24-26, have reported the construction of single-frequency microchip lasers which have a miniature, monolithic, flat-flat, solid-state cavity (e.g., 730 micron long cavity) whose mode spacing is greater than the gain bandwidth of the gain medium, and which are longitudinally pumped with the close-coupled, unfocused output of a laser diode.

The conversion of optical radiation at one frequency into optical radiation of another frequency by interaction with a non-linear optical material within an optical cavity is disclosed in U.S. Pat. No. 4,933,947 to D. W. Anthon and D. L. Sipes, "Frequency Conversion of Optical Radiation," which is assigned to the assignee of the present invention. A diode-pumped laser having a harmonic generator is disclosed by Robert Byer, G. J. Dixon and T. J. Kane in U.S. Pat. No. 4,739,507 and in an article by Byer, "Diode Laser-Pumped Solid-State Lasers," *Science*, Vol. 239, (Feb. 1, 1988) p. 745.

There are many practical applications of a method and apparatus which achieve harmonic conversion in a solid-state laser resonator, which is adopted to a wide variety of NLO materials, which have the advantages of small size, efficient lasing in a close-coupled pump geometry and ease of assembly, and which produce SHG outputs which are substantially greater than what might be expected from the physical size of the NLO material. Such a microlaser will not only have wide applications in the production of visible light, but also will be easy to manufacture on a mass production scale, thereby lowering costs and leading to even more practical uses.

SUMMARY OF THE INVENTION

One object of the invention is to provide an internally-doubled composite-cavity microlaser.

Another object is to provide a composite-cavity microlaser using quasi phase-matching.

Yet another object is to provide a microlaser utilizing quasi phase-matching techniques for achieving efficient non-linear optical frequency conversion in spectral regions where natural birefringence or dispersion for true phase-matching are not practical.

Still another object of the invention is to use a ring-shaped cavity to produce a traveling wave which can be phase-matched to a thin etalon of a non-linear optical material.

In accordance with the present invention, disclosure is made of a laser system comprising: a non-linear crystal that converts light at a fundamental wavelength to light at a harmonic wavelength and that has a thickness such that there is a phase mismatch between light at the fundamental wavelength and light at the harmonic wavelength in said crystal; first means for forming one of a travelling wave optical cavity and a standing wave optical cavity at the fundamental wavelength; and second means for forming one of a travelling wave and a standing wave optical cavity at the harmonic wavelength, the first means and said second means are located relative to the faces of said crystal such that the total phase mismatch of the light at the fundamental wavelength and the light at the harmonic wavelength, in the round trip path through the crystal and between each face of the crystal and the first means and the second means, is equal to zero or an integral multiple of $2\pi$.

In one particular embodiment of the invention, the laser system comprises: a linear cavity formed by a an non-linear optical material having end faces which are coated for resonance at a fundamental wavelength and at a harmonic of the fundamental. The temperature of the cavity is controlled to achieve quasi phase-matching. In another embodiment, the laser system comprises: a cavity formed by at least three mirrors which define three substantially straight legs or light paths; a non-linear crystal is located in one of the three paths; and length control means for controlling the relative length of at least one of the three paths to achieve quasi phase-matching.

Other advantages and features of the present invention will become readily apparent from the following detailed description of the invention, the embodiments described therein, the claims, and the accompanying drawings.

DETAILED DESCRIPTION OF THE INVENTION

While this invention is susceptible of embodiment in many different forms, there is shown in the drawings and will herein be described in detail several specific embodiments of the invention. It should be understood however, that the present disclosure is to be considered an exemplification of the principles of the invention and is not intended to limit the invention to the specific embodiments illustrated.

To understand quasi phase-matching in arbitrary laser resonator geometries it is helpful to think about the relative phases of harmonic and fundamental laser light as they enter and leave a nonlinear crystal. If we define the phase mismatch between the fundamental and harmonic to be zero at one surface of the crystal, it will have a nonzero value, denoted by $\Delta k_{crystal}$, as it exits through the opposite side. In a true "phase-matched" interaction, this phase difference is zero; in a "quasi-phase-matched" process it is not. The magnitude of the phase mismatch is determined by the length or thickness of the crystal and the difference in refractive index for the fundamental and harmonic beams propagating within it. The "coherence length" is that length or thickness of crystal which leads to a phase mismatch of $\pi$ radians (or 180 degrees).

Those skilled in the art will appreciate that a "wave-vector mismatch" occurs when $\Delta k_{crystal}$ is nonzero in the nonlinear crystal or in other parts of the resonator. In a quasi phase-matched crystal, a wave-vector mismatch that gives rise to a phase difference between the fundamental and harmonic lightwaves as they pass through it. Thus, if the phase difference between the fundamental and harmonic is zero at the input face of the crystal, then the phase difference after passing through it is equal to the product of the wave-vector mismatch, $\Delta k_{crystal}$, and the length of the crystal $L_{crystal}$.

In other words, the condition for achieving quasi phase-matching in a harmonic resonator is that the phase difference that exists when the two beams leave the nonlinear crystal is corrected or adjusted before the two waves pass through the crystal in the same direction again. The key concept to remember is that one should adjust the phases of the fundamental and harmonic as they come back into the crystal. Quasi phase-matching takes place when the phase difference is zero each time the fundamental and harmonic re-enter the crystal.

Figure 1:
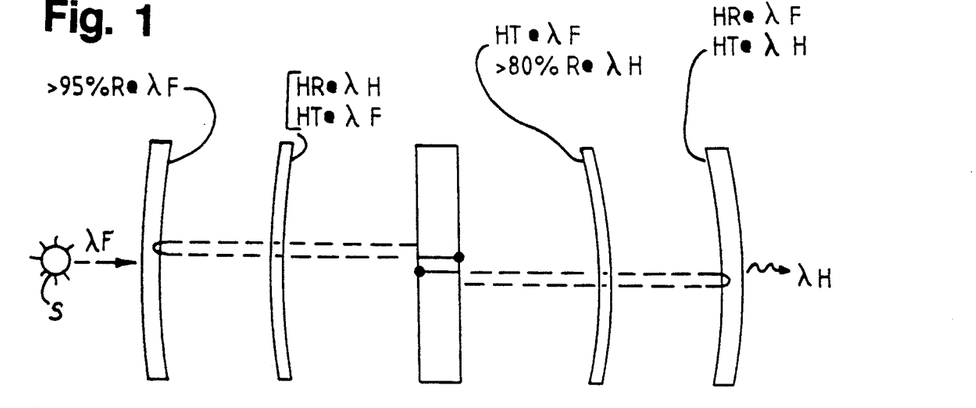
FIG. 1 is a schematic diagram of a laser system that is the subject of the present invention.
Figure 2:
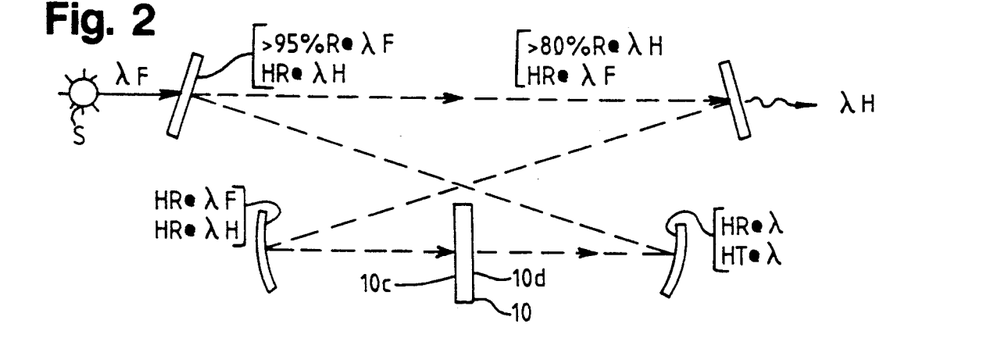
FIGS. 2 through 7 are schematic diagrams of additional embodiments of the laser system shown in FIG. 1.

Two general cases are shown schematically in FIGS. 1 and 2. In FIG. 1 a thin nonlinear frequency doubling crystal 10 is placed inside a standing wave cavity which is resonant at both the fundamental and harmonic wavelengths. Since the ability to quasi phase-match the interaction is dependent only on the magnitude of the phase difference at the two surfaces of the crystal 10, the actual physical location of the harmonic and fundamental reflectors inside the cavity is not critical. In other words, one is free to: place harmonic reflectors or mirros M3 and M4 on the two surfaces 10a and 10b of the doubling crystal 10, and place the fundamental mirrors M1 and M2 at two opposite ends of the cavity; or coat the crystal faces 10a and 10b to be antireflective (AR) and make the cavity end mirrors reflective at both the harmonic and the fundamental; or form some permutation these configurations.

FIG. 1 illustrates the general case in which the harmonic and fundamental cavities are formed by different mirrors which are not at the crystal 10 faces or ends 10a and 10b. The harmonic cavity is formed by mirrors M3 and M4 while the fundamental resonator is formed by mirrors M1 and M2. The relative positions of M1, M2, M3 and M4 are not critical.

In particular, one cavity mirror M1 is the input mirror which receives light at a fundamental wavelength from a source S. This mirror is coated to be greater than about 80% reflecting for light at the fundamental wavelength. The opposite cavity mirror M2 functions as an output coupler. It is coated to be highly reflecting (HR) at the fundamental wavelength (i.e., $\omega$ or $\lambda_F$) and highly transmitting (HT) at a harmonic (e.g., $2\omega$ or $\lambda_H = \frac{1}{2}\lambda_F$) of the fundamental.

Two internal cavity mirrors M3 and M4 are coated to be HT at the fundamental. One internal mirror M4 is coated to be highly reflective at the harmonic and the opposite internal mirror M3 is transmissive (e.g., less than about 25%) at the harmonic.

Quasi phase-matching is possible if the phase mismatch between the harmonic and the fundamental waves, as they travel to the right from one crystal face 10a to opposite mirrors M3 and M2, through the crystal, and back to the opposite crystal face 10b, is an integral multiple of $2\pi$. The phase mismatch as these two waves travel to the left from the other crystal face 10b to the opposite mirrors M1 and M4 and back to the other crystal face 10a must fulfill the same condition. The phase mismatch in going from one face 10b to the opposite mirrors M2 and M3 and back again is $\Delta B$. The value of this mismatch will be determined by the dispersion of the space or medium between that crystal face 10b and the two adjacent mirrors M2 and M3, in addition to the phase change which occurs on reflection. The phase mismatch for the round trip from the other crystal face 10a to the opposite mirrors M1 and M4, through the crystal and back again is $\Delta A$. Using these definitions, the conditions for quasi phase-matching in the nonlinear crystal 10 having a length of L crystal are summarized by the following expressions:

$$(\Delta k_{crystal})(L_{crystal}) + \Delta A = (2\pi)m \quad m = 0, 1, 2, 3 \ldots$$

$$(\Delta k_{crystal})(L_{crystal}) + \Delta B = (2\pi)n \quad n = 0, 1, 2, 3 \ldots$$

The harmonic and fundamental are both always resonant in the cavity if these two conditions are met. Thus, $$\Delta A + \Delta B + 2(\Delta k_{crystal})(L_{crystal}) = 2\pi p \text{ where } p = 0, 1, 2 \ldots$$

Several methods may be used to adjust $\Delta B$ and $\Delta A$. Three methods are shown in FIGS. 3A, 3B and 3C.

Figure 3A:
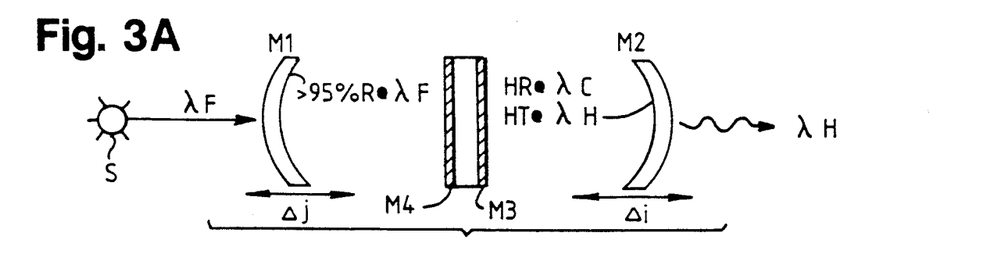

In FIG. 3A, the harmonic reflectors M3 and M4 are coated on the surface of a thin platelet 10 of nonlinear material which is placed in a linear cavity M1 and M2 that is resonant at the fundamental. In a doubly resonant system of the type shown in FIG. 3A, it is necessary for (1) the cavity formed by mirrors M1 and M2 to be resonant and the fundamental and (2) for the resonator formed by mirrors M3 and M4 to be resonant at the harmonic. Once these two conditions are established, the only variable left to adjust is the position of the two resonators with respect to each other. For example, if M3 and M4 are inside the fundamental resonator formed by M1 and M2, then the phase matching conditions can be achieved by translating the relative position of the ends of the harmonic resonator (i.e., see arrows $\Delta i$ and $\Delta j$).

Figure 3B:
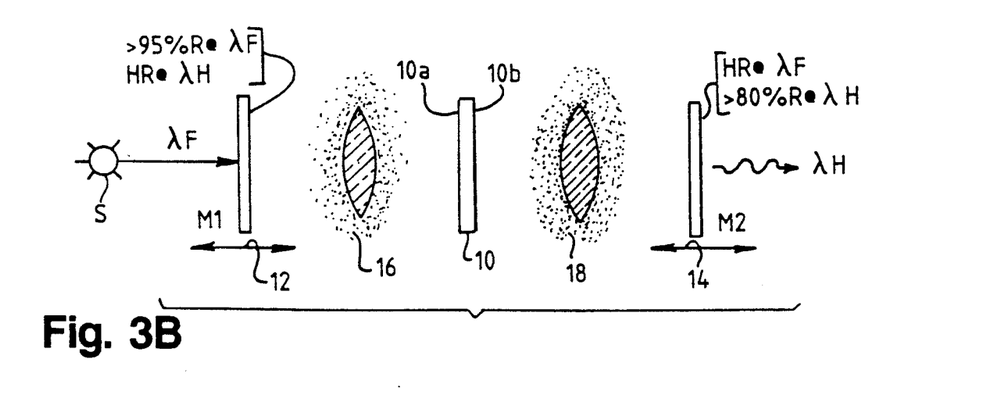

In FIG. 3B the harmonic and fundamental reflectors are both coated on the cavity mirrors M1 and M2. The phase mismatch is controlled by adjusting the position of the cavity end mirrors (see arrows 12 and 14) and/or the spacing or path between the crystal 10 and the cavity mirrors in such a way that the dispersion of the medium 16 and 18 (e.g., air, gas, or introduction of media other than a vacuum, glass wedges, etc.) between the crystal endfaces 10a and 10b and the cavity mirrors M1 and M2 produces the desired phase match.

Figure 3C:
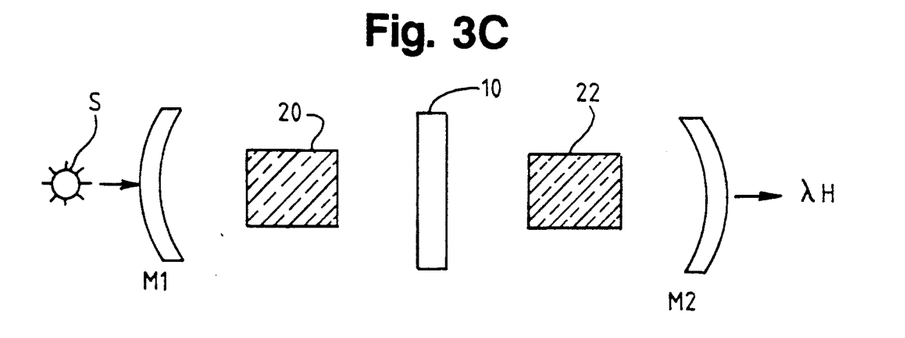

Turning to FIG. 3C, if the fundamental and harmonic are orthogonally polarized, the relative phases of the harmonic and fundamental lightwaves can be controlled by inserting birefringent plates 20 and 22 between the doubling crystal 10 and the resonator end mirrors M1 and M2. In this scheme, the phase mismatch can be controlled very precisely by changing the temperature of the birefringent plates 20 and 22 (also by introducing a birefringent or dispersive material, glass wedges, etc.).

Figure 4:
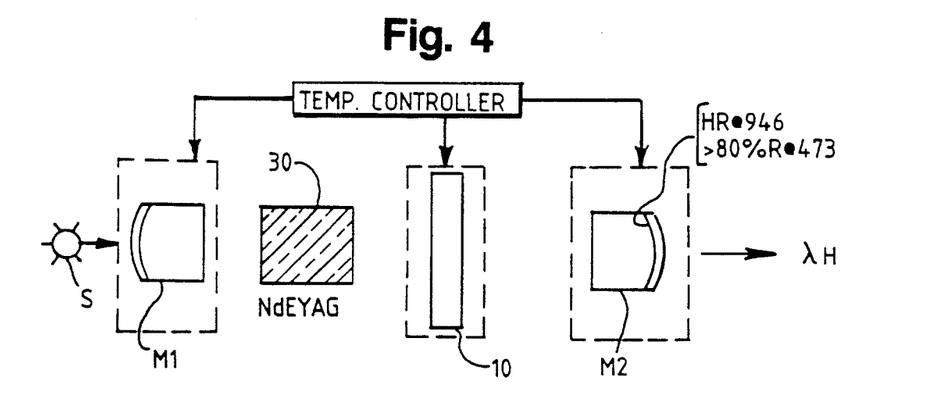

Those skilled in the art will appreciate the methods just described apply to thin nonlinear crystals placed in either external buildup cavities (i.e., external resonant doubling) or the laser cavity itself (i.e., intracavity doubling). The basic requirement is that phase matching conditions are met. More specifically, FIG. 4 illustrates an intracavity, doubled, quasi phase-matched laser operating at a fundamental of 946 nm and having an output of 473 nm. A laser diode source S running at 810 nm is used to pump a Nd:YAG crystal 30 to produce 946 nm light which is converted, by means of a diffused Lithium Niobate (LiNbO$_3$) crystal 10, to a 473 nm harmonic. The end mirrors M1 and M2 are formed by coatings on a substrate (e.g., MgO:LiNbO$_3$ or quartz). The crystallographic axes of the quartz mirrors and the non-linear crystal 10 are located parallel to each other. All intracavity light incident surfaces are anti-reflecting (AR) coated at 946 nm and 473 nm. A temperature controller 50 adjusts the temperature of the mounts for the quartz mirrors and the LiNbO$_3$ crystal, and hence their birefringence and the phase mismatch in the cavity.

Figure 5:
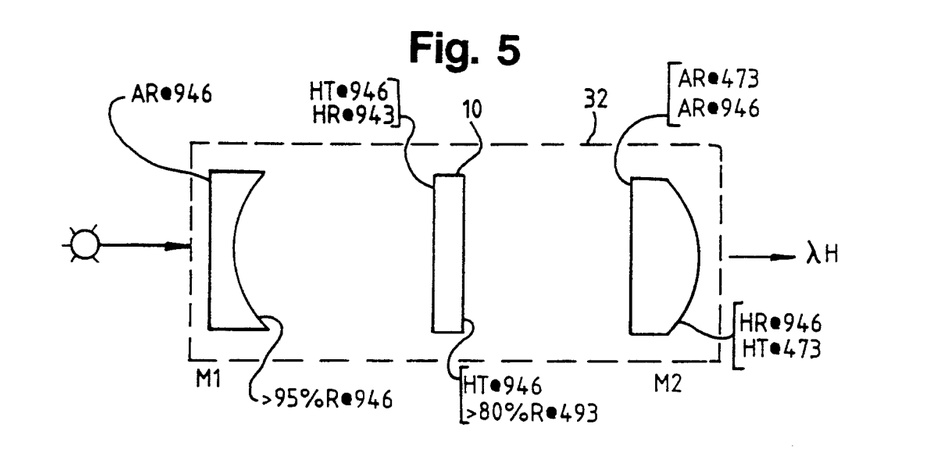

FIG. 5 illustrates the application of the invention to the external resonant doubling situation. All the cavity components are located in temperature controlled housing 32. The coatings on the output coupler M2 are carried by a glass substrate 33. In order to get quasi phase-matching, these conditions should be satisfied:

1. The resonator formed by mirrors M1 and M2 must be resonant at the fundamental wavelength.
2. The harmonic resonator formed by mirrors M3 and M4 must be resonant at the harmonic wavelength.
3. The phase difference between the fundamental and harmonic as they leave the harmonic resonator going towards M1 and as they return must be an integral multiple of $2\pi$.

If these three conditions are met, then the phase conditions for light travelling to the right from the nonlinear resonator will automatically be satisfied.

While the design shown in FIG. 4 uses three separate temperature controllers to achieve these conditions, the design in FIG. 5 uses only one. The design shown in FIG. 5 is directed to the use of crystals 10 (e.g., KTP) whose coherence length is relatively insensitive to temperature and whose indices of refraction and optical path lengths have reasonable temperature coefficients. In the design of FIG. 5, the optical length of the harmonic resonator and the fundamental resonator tune at different rates. As a result there will exist a temperature at which they are simultaneously resonant at their respective wavelengths. In addition, the birefringent substrate on which mirror M2 is coated will change birefringence as the temperature is increased at a third rate. Because the two resonant conditions and the phase mismatch associated with the round trip from the nonlinear crystal 10 to M2 and back again are dependent on temperature in different ways, there will exist a 'sweet spot' at which all three conditions are met simultaneously, if the temperature is ramped over a large enough range.

Figure 6:
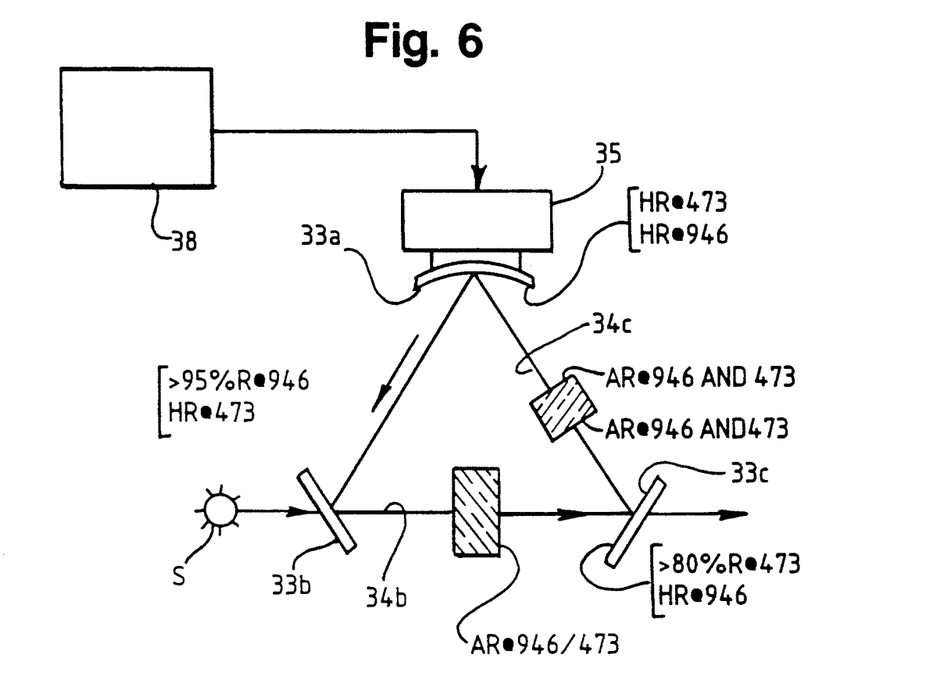
Figure 7:
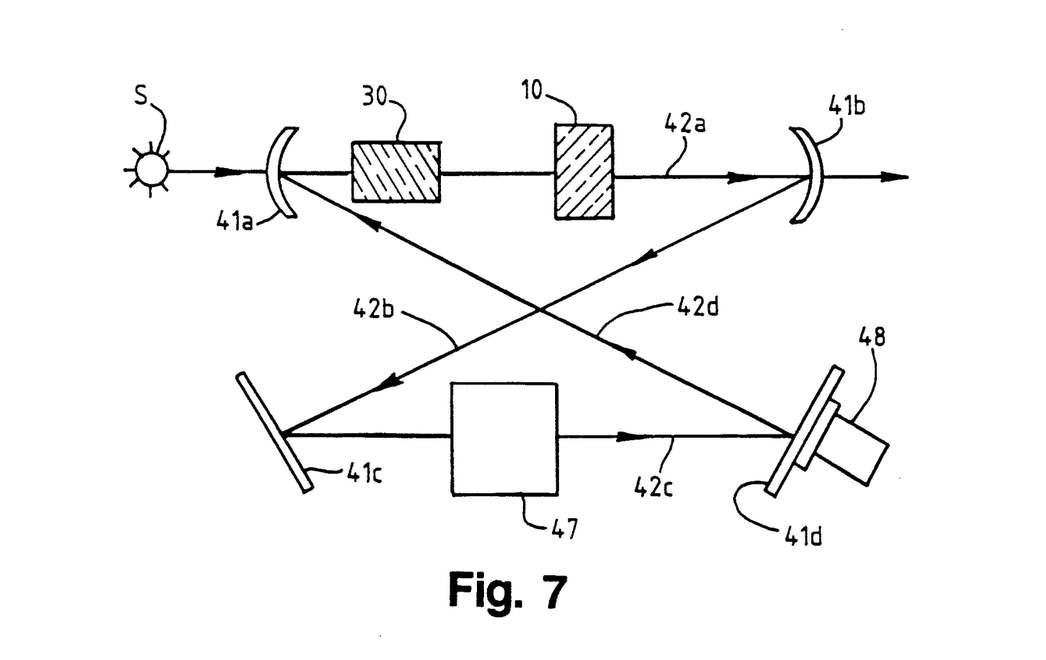

FIGS. 2, 6 and 7 show both three and four-bounce ring or travelling wave resonators which can also be used to achieve quasi phase-matching. The quasi phase-matching technique used in FIGS. 2 and 7 is different from that used in FIG. 6. The basic difference between the two techniques lies in the fact that the harmonic resonator in FIGS. 2 and 7 is a linear, standing wave resonator while a ring resonator is used in FIG. 6. The fundamental ring and the harmonic ring resonators in FIG. 6 are formed by the same mirrors.

In FIGS. 2 and 7, quasi phase-matching is achieved much as that described by J. A. Armstrong, supra. The travelling-wave fundamental produces a second harmonic output when it passes through the non-linear crystal. The harmonic field is then reflected by the second mirror in the harmonic resonator, travels back through the crystal and is reflected by the mirror on the input face of the nonlinear crystal. When the harmonic field is resonant in the harmonic resonator, then the round trip phase shift (and, hence the phase difference between the fundamental and harmonic) is an integral multiple of $2\pi$. In this manner, quasi phase-matching is achieved.

In the scheme shown in FIG. 6, the three mirrors forming the ring are reflective at both the harmonic and fundamental wavelengths. In this case, both fields are travelling waves (since there is no backwards travelling harmonic field inside the cavity) and for phase matching the phase difference between the fundamental and harmonic as they travel around the resonator is an integral multiple of $2\pi$. If there is a phase difference equal to $(\Delta k_{crystal}) \times (L_{crystal})$ between the two waves as they travel through the nonlinear crystal from left to right, then it is essential that the phase difference between the two, as they travel around the resonator, sum with the crystal phase difference to equal an integral multiple of $2\pi$. This condition is satisified if the harmonic field is made to be resonant in the cavity.

In order to achieve simultaneous resonance at both the fundamental and harmonic wavelengths, a dispersive element 99 should be located in the cavity that will tune the phase difference between the two beams. This is illustrated in FIG. 6; it is essential to include this element 99 to achieve quasi phase-matching in this resonator. If the second harmonic is generated through a Type I process (i.e., one where the fundamental and harmonic field are orthogonal to one another), it is possible to use a temperature-tuned birefringent plate 99 or other suitable device (e.g., temperature turned dispersive element, one or more mechanically moved opposing glass wedges, etc.) to make the cavity simultaneously resonant for both wavelengths. This case is very similar to the linear resonator case, except for the fact that one needs only one waveplate to meet the phase matching conditions.

Turning to FIG. 6, a ring-shaped cavity is formed by three mirrors 33a, 33b and 33c which are arranged at the vertices of a triangle such that light is reflected along three substantially straight connected lines 34a, 34b and 34c which form the "legs" of the ring-shaped cavity. The ring-shaped cavity is externally pumped by a source S through a mirror 33b (i.e., the input mirror) which is coated for 99.5% to 95% transmission at wavelength of the source S. The other two mirrors 33a and 33c are coated HR at wavelength of the source. One mirror 33a (i.e., the cavity length control mirror) is moved by a translator 36 (e.g., a piezo-electric translator) in response to a control 38 to change the optical length of the three legged ring-shaped resonant cavity. The last mirror 33c (i.e., the output mirror) is coated HT at the wavelength of the harmonic. The crystal 10 (e.g., KTP) is located in that leg 34b of the ring-shaped resonator which is between the input mirror 33b and the output mirror 33c. The dispersive element 99 is located in one of the two other legs.

In one specific embodiment, the external source S is a diode pumped Nd:YAG laser operating at 946 nm, and the crystal 10 is made from KTiOPO$_4$ (or KTP) which produces a second harmonic at 473 nm. KTP has many unique properties, especially for frequency doubling Nd:YAG lasers and for use in various electro-optic and integrated optic applications. KTP is just one member of the family of materials with the formula MTiO(XO$_4$), where "M" is one of K, Rb, Ti, or NH$_4$ and "X" is P or As except when NH$_4$ is present and then "X" is only P. KTiOAsO$_4$ (or KTA) is another member of this family of non-linear optical materials. KTA has some important advantages over KTP in SHG conversion efficiency, in electro-optic switching voltages and figures of merit, and in ionic conductivity. Bierlein et al, "KTiOAsO$_4$: A New Nonlinear Material", *CLEO-89*, paper ThQ5.

Resonance of the second harmonic field within the KTP is assured by the cavity length control system 36 and 38 which is adjusted to correctly adjust the phase of the reflected harmonic wave so that it is correctly matched for harmonic generation on each forward trip through the traveling wave cavity.

Turning to FIG. 7, another embodiment of the present invention is illustrated. The non-linear crystal 10 (e.g., LiNbO$_3$) is pumped using a lasant material 30 which is located in the ring-shaped cavity. In particular, a Nd:YAG rod 30, operating at 946 nm, is pumped by an external diode laser source S operating at about 810 nm. The ring-shaped cavity comprises four mirrors 41a, 41b, 41c and 41d which are arranged to have light travel along four connected straight legs 42a, 42b, 42c and 42d in a "figure-8" or in a "bow-tie" shaped path. Those skilled in the art will recognize that the four legs are not necessarily in the same plane and that the two crossed legs are 42b and 42d do not necessarily intersect.

The crystal 10 and the Nd:YAG source 30 are located in one leg 42a. The end faces 10a and 10b of the crystal are coated for high transmission at the fundamental and sufficiently reflective at the harmonic to form a subresonator. To insure laser light from the Nd:YAG laser travels in one direction along the four legs, a "unidirectional device" 47 (e.g., Faraday Rotator, acoustic optical cell, etc.) is inserted in another leg 42c. The input mirror 41a is coated HR at 946 and HT at 810 nm. The output mirror 41b is coated HR at 946 nm. A cavity length control 48 can be located to move one of the mirrors 41d. Cavity length may also be changed by counter-rotating two quartz plates inserted in a leg at the Brewster angle. As the plates are rotated, the optical path length through the quartz plates is changed. Because quartz has an index of refraction significantly different from that of air, the optical length of the cavity changes. This causes the cavity modes to smoothly scan frequency. The plates can be rotated by a piezo-electric transducer which is part of an open loop or closed loop feedback system which adjusts the cavity length to maximize the output at 473 nm.

The concept of using a sub-resonator for SHG in a traveling wave optical cavity can be used for lasers operating at a variety of wavelengths has special utility when used in a tunable device or in commercial applications where a broad variation of operating temperature is expected. Most importantly, it allows the extension of the phase-matching ranges of commonly available NLO crystals to regions of the spectrum where true birefringence-based phase-matching is not normally possible. In all cases, harmonic resonance increases the effective non-linearity to a point where it compares favorably with available non-linear crystals which may have undesirable material properties or phase-matching widths which are less than optimal for practical commercial devices.

Another advantage of an external ring-shaped or traveling wave configuration is the fact that it lends itself to large scale production more readily than monolithic external ring designs. Experience with potassium niobate indicates that it is, at best, a difficult crystal to work with due to a tendency to undergo twinning and/or to depole into multiple ferroelectric domains when thermally or mechanically stressed. By contrast, in the externally pumped ring-shaped design (i.e., FIG. 6), a rectangular parallel-piped of KTP, for example, is all that is needed to form the NLO etalon. The two a-axis faces are the only surfaces of the KTP which need to be polished and coated, thereby minimizing the number and complexity of the fabrication steps involved in its production. In contrast to monolithic ring designs, it is possible, in principle, to polish and coat tens or hundreds of sub-resonator etalons in a single operation. Furthermore, production experience with single-frequency Nd:YAG lasers indicates that, in a well engineered structure, an external mirror resonator has immunity to vibration that is comparable to that of a monolithic structure.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made, materials may be substituted and separate features of the invention may be utilized. For example, the principle just described equally applies to difference-frequency generation, sum-frequency generation, optical parametric oscillation, both doubly and singly resonant, and to the use of self-doubling materials (e.g., NYAB). The present invention may be applied to resonant sub-cavities for various intracavity modulation schemes. Moreover, both organic and inorganic frequency conversion of NLO materials and other ring laser shapes (e.g., square, etc.) are included within the teachings of the present invention. Thus, it will be appreciated that various modifications, alternatives, variations, etc., may be made without departing from the spirit and scope of the invention as defined in the appended claims. It is intended to cover, by the appended claims, all such modifications involved within the scope of the claims.

I claim:

1. A laser system, comprising:
   a) a non-linear crystal having two opposite faces, said crystal when said faces are pumped with laser light at a fundamental wavelength producing light at a harmonic wavelength, said crystal having a thickness between said faces such that there is a phase mismatch between light at said fundamental wavelength and light at said harmonic wavelength in said crystal;
   b) first means, disposed toward each of said faces of said crystal, for forming one of a travelling wave optical cavity and a standing wave optical cavity at said fundamental wavelength; and
   c) second means, disposed toward each of said faces of said crystal, for forming one of a travelling wave and a standing wave optical cavity at said harmonic wavelength, said first means and said second means being located relative to said faces of said crystal such that the total phase mismatch of said light at said fundamental wavelength and said light at said harmonic wavelength in the round trip path through said crystal and between each face of said crystal and said first means and said second means is equal to an even integral multiple of $2\pi$.

2. The laser system of claim 1, wherein said first means forms a travelling wave optical cavity at said fundamental wavelength; wherein said second means forms a travelling wave optical cavity at said harmonic wavelength; and wherein said first means and said second means are located relative to said faces of said crystal to have each of said travelling wave cavities in resonance.

3. The laser system of claim 1, wherein said first means forms a standing wave optical cavity at said fundamental wavelength; wherein said second means forms a travelling wave optical cavity at said harmonic wavelength; and wherein said first means and said second means are located relative to said faces of said crystal to have said standing wave optical cavity and said travelling wave cavity in resonance.

4. The laser system of claim 1, wherein said first means forms a traveling wave optical cavity at said fundamental wavelength; wherein said second means forms a standing wave optical cavity at said harmonic wavelength; and wherein said first means and said second means are located relative to said faces of said crystal to have said traveling wave optical cavity and said standing wave cavity in resonance.

5. The laser system of claim 1, wherein said first means forms a standing wave optical cavity at said fundamental wavelength; wherein said second means forms a standing wave optical cavity at said harmonic wavelength; and wherein said first means and said second means are located relative to said faces of said crystal such that the phase mismatch between said light at said fundamental wavelength and said light at said harmonic wavelength in the path from each face of said crystal and to said first means and said second means and back through said crystal to the opposite face of said crystal is equal to an even integral multiple of $2\pi$.

6. The laser system of claim 5, where at least one of said first means and said second means comprises at least one mirror that reflects light at said fundamental wavelength and light at said harmonic wavelength in the direction of said one face of said crystal, and that is spaced apart from said one face.

7. The laser system of claim 6, wherein said one mirror is coated for reflection of said light; and wherein a light transmissive medium is located between said crystal and said one mirror.

8. The laser system of claim 6, wherein said one mirror is coated for reflection of said light; and wherein a birefringent medium occupies at least part of the space between said one face of said crystal and said one mirror.

9. The laser system of claim 6, wherein said one mirror comprises a reflective coating on a quartz substrate for reflection of light at said fundamental wavelength and light at said harmonic wavelength; and wherein at least one of said crystal and said one mirror are temperature controlled.

10. The laser system of claim 9, wherein said crystal comprises $LiNbO_3$; and wherein the crystallographic axes of said crystal and said quartz are generally parallel.

11. The laser system of claim 1, where said second means comprises a coating, carried on at least said one face of said crystal, for reflecting light at said harmonic into said crystal.

12. The laser system of claim 1, wherein said first means and said second means comprise: two mirrors on each side of said crystal that are highly reflective at said harmonic wavelength and at said fundamental wavelength; and two additional mirrors which receive light from said two mirrors such that light at said harmonic wavelength and light at said fundamental wavelength travels along a four legged path, one of said two additional mirrors being highly reflective at said harmonic wavelength and the other of said two additional mirrors being highly reflective at said fundamental wavelength and reflective at said harmonic wavelength.

13. The laser system of claim 12, wherein said one mirror is coated for reflection of light at said fundamental wavelength and light at said harmonic wavelength; and wherein a dispersive medium occupies at least part of the space between said crystal and said one mirror.

14. The laser system of claim 13, wherein said medium is both birefringent and dispersive.

15. A laser system, comprising:
   a) a crystal that has two opposite flat faces, that when pumped with laser light at a fundamental wavelength produces laser light at a harmonic wavelength, and that has a thickness "L" such that when the wave vector mismatch of light at said fundamental wavelength and light at said harmonic wavelength in said crystal is zero at one face of said crystal, the wave vector mismatch at the opposite face has a non-zero value "$\Delta k_c$";
   b) reflective means, disposed toward each of said faces of said crystal, for forming a standing wave optical cavity at said fundamental wavelength;
   c) coating means, disposed toward each of said faces of said crystal, for forming a standing wave optical cavity at said harmonic wavelength, the wave vector mismatch between said light at said fundamental wavelength and said light at said harmonic wavelength along the path from one face of said crystal through said crystal and back to the opposite face of said crystal having a value "$\Delta A$", the wave vector mismatch between light at said fundamental wavelength and said light at said harmonic wavelength along the path from said opposite face of said crystal through said crystal and back to said one face of said crystal having a value "$\Delta B$"; and
   d) condition means for achieving the conditions:

$$\Delta k_c L + \Delta A = 2\pi q \text{ and } 2(\Delta k_c)(L) + \Delta A + \Delta B = 2\pi p$$

where "p" and "q" are zero or an integer.

16. The laser system of claim 15, wherein said light at said harmonic wavelength is orthogonally polarized relative to said light at said fundamental wavelength; and wherein said condition means comprises a birefringent plate, inserted between said faces of said crystal, said first means and said second means, and comprises means for regulating the temperature of said birefringent plate to achieve said condition.

17. A laser system, comprising:

a) a traveling wave optical cavity, characterized by a cavity length, for light having a fundamental wavelength;
b) harmonic sub-resonator means, located in said cavity and pumped by laser, for generating laser light whose wavelength is a harmonic of said fundamental wavelength, said harmonic sub-resonator means comprising an etalon of a non-linear optical material having two opposite ends and having a thickness that is measured between said ends and that is less than the coherence length for the interaction of said radiation of said fundamental wavelength therewith to yield said harmonic radiation; and
c) length control means, operatively connected to said traveling wave optical cavity, for adjusting said cavity length such that the wave vector mismatch at each end of said optical material is negligible.

18. The laser system of claim 17, wherein said traveling wave optical cavity has at least three substantially straight light paths;
wherein said harmonic sub-resonator means is located in one of said three light paths; and
wherein said length control means comprises means for controlling the relative length of at least one of said legs.

19. The laser system of claim 17, wherein said harmonic sub-resonator means is pumped by a laser that produces light at said fundamental wavelength, and that is located outside said traveling wave optical cavity.

20. The laser system of claim 17, wherein said etalon is birefringent material having two opposite faces, one of said faces being highly transmissive at said fundamental wavelength and much more reflective than transmissive at said harmonic wavelength.

21. The laser system of claim 17, wherein said traveling wave optical cavity has four legs, one of said four legs having located therein said sub-resonator means; and further including:
means, in said traveling wave optical cavity, for producing laser light at said fundamental wavelength; and
direction control means, in said traveling wave optical cavity, for causing light to travel substantially in one direction in said cavity.

22. The laser system of claim 17, wherein said traveling wave cavity has at least four straight light paths.

23. The laser system of claim 17, wherein said traveling wave optical cavity includes pumping means, operating in response to an external source, for producing in said cavity said laser light at said fundamental wavelength.

* * * * *